Nov. 18, 1958   A. BAUER   2,861,204
MAGNETIC MOTOR

Filed Nov. 15, 1955   2 Sheets-Sheet 1

INVENTOR
ANTON BAUER
BY
AGENT

Nov. 18, 1958 A. BAUER 2,861,204
MAGNETIC MOTOR

Filed Nov. 15, 1955 2 Sheets-Sheet 2

INVENTOR
ANTON BAUER
BY
AGENT

United States Patent Office 2,861,204
Patented Nov. 18, 1958

2,861,204

MAGNETIC MOTOR

Anton Bauer, Frankfurt am Main, Germany, assignor, by mesne assignments, to North American Philips Company, Inc., New York, N. Y., a corporation of Delaware Application November 15, 1955, Serial No. 546,974

3 Claims. (Cl. 310—46)

The invention relates to a device for controlling the speed of an electric motor, particularly fed by direct current, for example for driving supports of sound records, such as a turntable for a talking machine, this device comprising a vibration system driven by the motor itself and controlling the speed of the motor in accordance with its natural amplitude, which may be adjustable, this vibration system acting upon a contact device controlling the motor.

Such a device is known. The interruptor of such a device is driven by means of a lug by a toothed wheel seated on the turntable shaft, the number of teeth of this wheel corresponding to iron blocks distributed on the pitch circle. The interruptor is always closed by the toothed wheel when an iron block on the side opposite the direction of rotation is subjected to the action of an electromagnet which is energized by closing the contacts of the interruptor and the interruptor is opened so that the electromagnet is deenergized when the iron block has exceeded the maximum field strength in the direction of rotation. There prevails no fixed ratio between the speed of rotation and the number of iron blocks or teeth, similar to a collector motor, in which the number of laminations does not determine the speed. The iron blocks are attracted the stronger, the higher is the energizing current for the stator or the less the turntable is loaded. This gives necessarily rise to an acceleration of the operations, so that the speed of rotation increases further. Finally a compensation is found, in which the speed of rotation remains constant, if the operational conditions remain the same. However, since the mains voltage and the load vary frequently, this driving gear has a speed limitation, which operates in the same manner as the Tirill regulator employed often in servomotors. Such a reactive, electro-mechanical control has, of course, a tendency to irregularties. Moreover, the lug of the interruptor, which engages the toothed wheel, may produce a certain amount of noise during the operation. It may occur that in this case, subsequent to its rotation, the turntable remains in a position such that the interruptor is open and the driving gear does not start automatically.

According to the invention these disadvantages are obviated by providing a vibration system comprising an elastic member with a permanent magnet secured thereto by causing the permanent magnet to vibrate by means coupled with the driven body, for example by a toothed rim of ferro-magnetic material, by magnetic agency and by keeping the motor in the starting position, when it stands still, by the same means.

The invention will be described more fully with reference to the accompanying, diagrammatical drawings.

Figure 1:
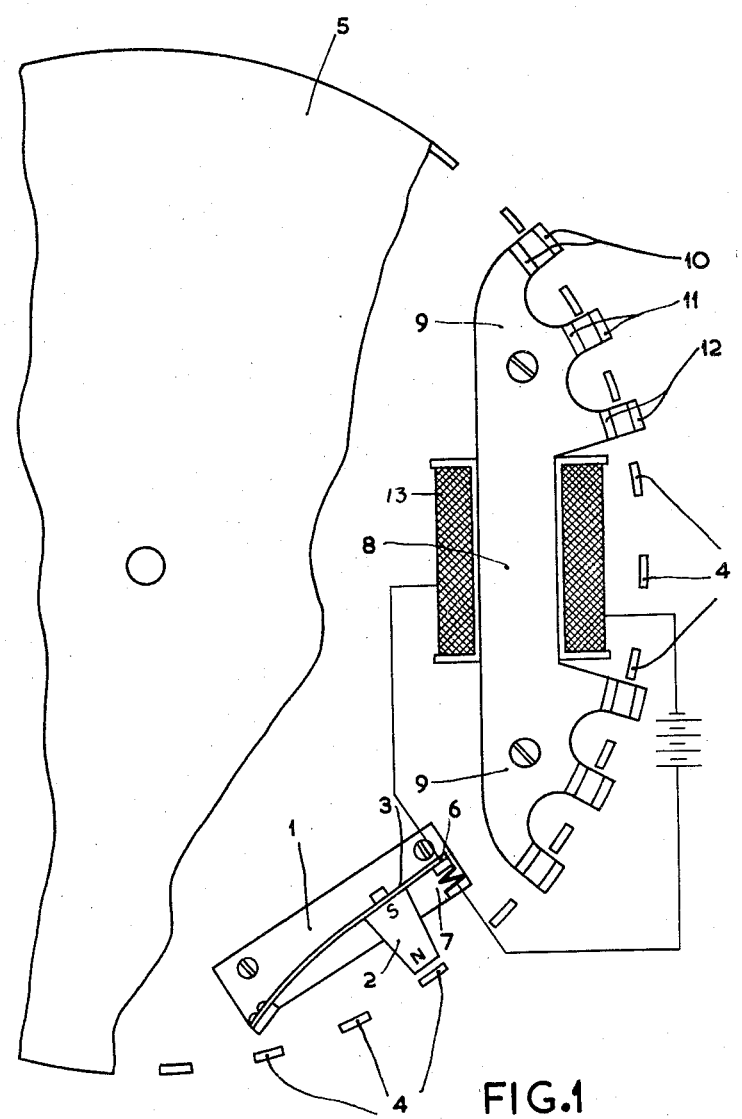
Fig. 1 is a plan view, partly a sectional view.
Figure 2:
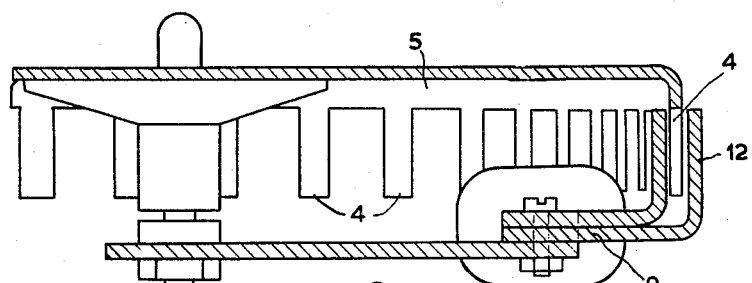
Fig. 2 is a side view.
Figure 3:
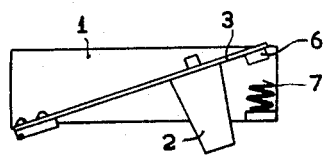
Fig. 3 shows the vibration mechanism with open contacts.

According to Fig. 1 the interruptor 1 is driven by means of a small permanent magnet 2, which is secured to the interruptor reed 3, which opens and closes the contacts 6 and 7 in the rhythm of the teeth 4 of the turntable 5, the number of which corresponds to that of the aforesaid iron blocks. The interruptor 1 is arranged in a manner such that the reed 3 with the magnet can move in the direction of the teeth 4, but so that the magnet 2 does not touch the teeth 4, even in its full amplitude. The vibration transmission from the teeth to the interruptor reed is therefore free from noise. Moreover, the magnet 2 ensures the starting, since in the position of rest the magnet holds the turntable always in a position such that the magnet 2 and the teeth 4 are opposite one another, the interruptor contacts 6 and 7, through which the winding 13 of the stator 8 is energized from a voltage source, being then closed.

The vibration mass of the interruptor reed 3 is, owing to the magnet, comparatively large, so that the spring force of the tag 3 can be fixed to be such that it resonates in the range suitable for the interruptor frequency between 40 and 60 C./S. If the interruptors were driven by a toothed wheel, no resonance would occur, owing to the permanent contact: at any rate, the resonance accuracy required for a sufficient stabilisation of the speed would not be obtained. Even with a magnetically driven interruptor the resonance accuracy is limited since the reed 3 is dampened at each engagement with the contact. However, one of the contacts, for example contact 7, may be constituted by a blade spring or a spiral spring, so that the damping and the contact noise are reduced. However, a certain value of damping is required, since otherwise the amplitude would increase in the resonance range to an extent such that the magnet 2 would engage a passing tooth 4. The limitation of the speed by means of this device may be accounted for by the fact that the amplitude of the interruptor reed 3 decreases rapidly when the tag is energized in excess of its resonance frequency and that between the driving force, in this case the teeth 4 passing by, and the performed movement of the interruptor reed a time-lag (phase shift) occurs. When the turntable 5 tends to rotate more rapidly owing to a decrease in load or to an increase in electric voltage across the winding 13, the switching-on time decreases and also the time, during which the force providing the torque of the stator 8 becomes operative. The aforesaid phase shift is, in this case, particularly important. The interruptor reed 3 has a smaller amplitude, if it is energized in a more rapid order of succession than that corresponding to its resonance frequency. The reed vibrates, it is true, approximately with the frequency of the driving force, but it follows this force with a certain time-lag, which increases further, according as the frequency of the driving force increases with respect to the resonance frequency of the reed (angle of displacement at the upper limit of the bandwith is —45°). This means that the current pulse is no longer applied to the area which is most favourable for attraction, it is applied thereto not until the teeth 4 have penetrated already partly into the stator 8. Then, however, the interruptor switches off later, so that the teeth 4 (i. e. the mass of the turntable 5) must furnish an additional dying-out force. Consequently, various factors counteract the increase in rotational speed: owing to their electric nature these factors have no after-control, but they stabilize uniformly the speed of rotation.

As stated above, in accordance with the invention, the turntable 5 is not provided with a rim of iron blocks, since otherwise the costs of manufacture would be increased materially: at the edge of the turntable provision is made of teeth 4, so that the turntable 5 can be punched together with the teeth from an iron sheet and the toothed edge can be formed cylindrically in a subsequnt operation. The iron mass operative at the rotor (turntable) is, however, small in this embodiment. The latter may be increased by causing the poles 9 of the stator 8 to terminate in various fingers 10, 11 and 12, so that a larger number of teeth 4 contributes to the production of the torque. The fingers 10, 11, 12 must have the width and the intermediate spaces of the teeth. The spaces amount to about twice the width. The stator 8 consists of two parts of iron sheet of equal shaped and thicknesses, which may be secured to one another by riveting or the like, subsequent to bending. The coil former of the winding 13 must, with this shape of the stator section, consist of two halves and the winding must be applied to the complete stator.

What is claimed is:

1. A speed control device for an electric motor of the type used for driving a phonograph turntable comprising a vibration assembly including a yieldable member, a permanent magnet secured to said yieldable member separate contact means for controlling said electric motor mounted on said vibration assembly, a toothed rim of ferromagnetic material mounted on said turntable adjacent to said permanent magnet, said vibration assembly controlling the speed of said motor through said contact means in accordance with the natural amplitude of said yieldable member, said permanent magnet being vibrated by the magnetic force between said magnet and said toothed rim of ferromagnetic material to increase and decrease the distance between the permanent magnet and the latter and to thereby open and close said contact means and holding said motor in the starting position when the same is inoperative, said vibration assembly being so arranged that there is no contact between the magnet and toothed rim in the operative condition of said device.

2. A speed control device as clamed in claim 1 wherein said contact means includes two interruptor contacts, one of which is a helical wire whereby the mechanical damping of part of said vibrating assembly and the noise therein are reduced.

3. A speed control device as claimed in claim 1 further comprising a stator, the poles of said stator terminating in a plurality of fingers.

References Cited in the file of this patent

UNITED STATES PATENTS

| | | |
|---|---|---|
| 1,376,166 | Rosenberg | Apr. 26, 1921 |
| 1,419,749 | Murphy | June 13, 1922 |
| 1,435,186 | Stalker et al. | Nov. 14, 1922 |
| 1,844,649 | Greibach | Feb. 9, 1932 |
| 2,001,439 | Thompson | May 14, 1935 |
| 2,018,677 | Kolhagen | Oct. 29, 1935 |
| 2,266,037 | Henninger et al. | Dec. 16, 1941 |
| 2,473,839 | Altfather | June 21, 1949 |